(12) United States Patent
Emalfarb

(10) Patent No.: US 8,413,374 B2
(45) Date of Patent: Apr. 9, 2013

(54) PLANTING SYSTEM

(75) Inventor: Bradley Emalfarb, Riverwoods, IL (US)

(73) Assignee: Woodstream Corporation, Lititz, PA (US)

( * ) Notice: Subject to any disclaimer, the term of this patent is extended or adjusted under 35 U.S.C. 154(b) by 240 days.

(21) Appl. No.: 12/926,417

(22) Filed: Nov. 16, 2010

(65) Prior Publication Data

US 2011/0232182 A1  Sep. 29, 2011

Related U.S. Application Data

(63) Continuation of application No. 11/143,216, filed on Jun. 2, 2005, now abandoned.

(51) Int. Cl.
*A01G 9/02* (2006.01)

(52) U.S. Cl.
USPC .............. 47/66.1; 206/423; 206/774; 47/65.5

(58) Field of Classification Search .................... 47/65.5, 47/65.7, 66.1, 66.6, 73, 85, 86; 206/423, 206/745, 774; 220/4.01, 4.04, 4.06, 4.07, 220/4.21, 4.26
See application file for complete search history.

(56) References Cited

U.S. PATENT DOCUMENTS

| D24,231 | S | | 4/1895 | Berry | |
|---|---|---|---|---|---|
| D24,232 | S | | 4/1895 | Berry | |
| 2,998,896 | A | * | 9/1961 | Miller | 220/4.26 |
| 3,375,607 | A | * | 4/1968 | Odd | 47/74 |
| 3,741,379 | A | * | 6/1973 | Kappler et al. | 206/457 |
| 4,024,670 | A | * | 5/1977 | Stanley | 47/73 |
| 4,124,135 | A | * | 11/1978 | Weder et al. | 220/4.21 |
| 2006/0150498 | A1 | * | 7/2006 | Chen | 47/65.5 |

FOREIGN PATENT DOCUMENTS

| JP | 2001-340005 | | 12/2001 |
|---|---|---|---|
| WO | WO/00/72655 | * | 12/2000 |

* cited by examiner

*Primary Examiner* — Rob Swiatek
*Assistant Examiner* — Michael Kreiner
(74) *Attorney, Agent, or Firm* — Jacobson Holman PLLC

(57) ABSTRACT

The combination of a container and a growing medium for a plant. The container is made to simulate the appearance of an egg shell bounding a receptacle. The growing medium is provided in the receptacle.

18 Claims, 3 Drawing Sheets

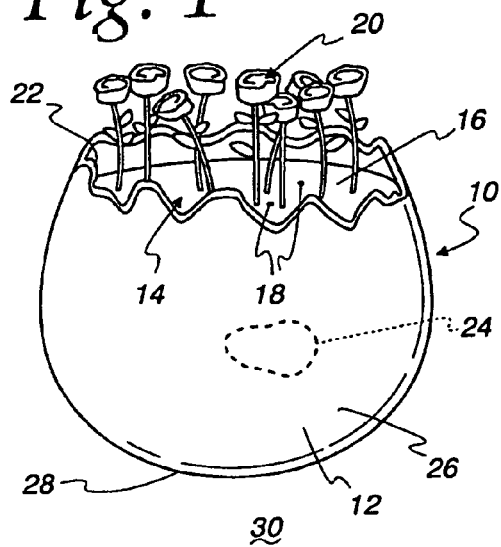
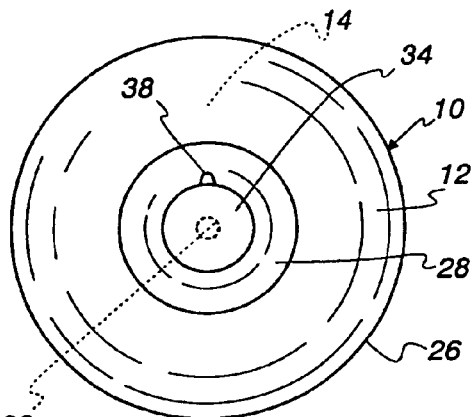
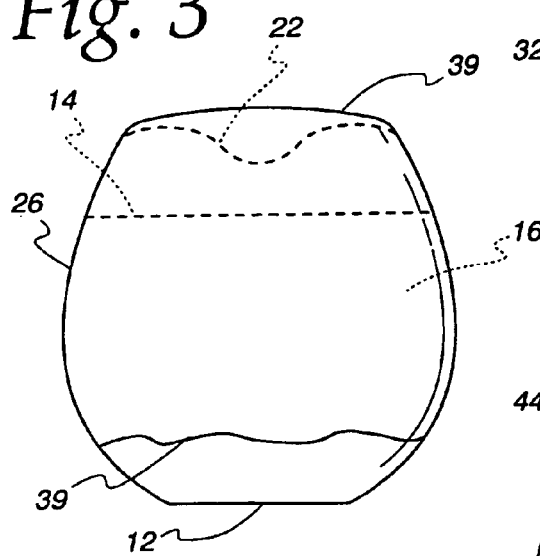
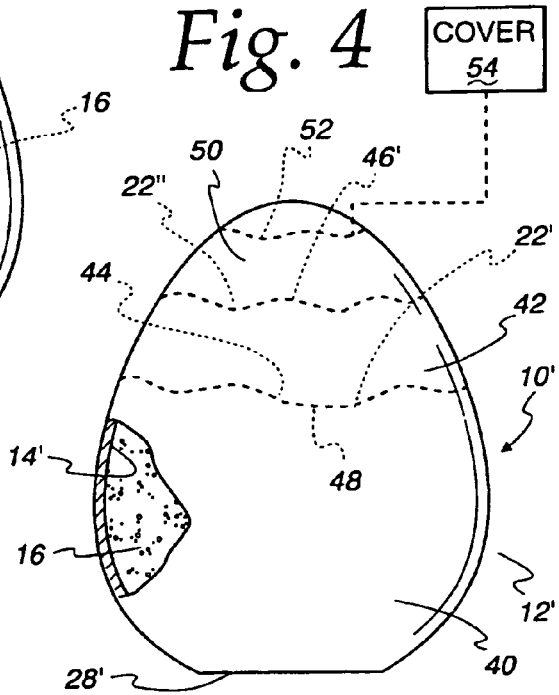

PLANTING SYSTEM

RELATED APPLICATIONS

This is a continuation application of application, U.S. Ser. No. 11/143,216, filed Jun. 2, 2005, now abandoned and hereby claims the priority thereof to which it is entitled.

BACKGROUND OF THE INVENTION

1. Field of the Invention

The invention relates to planting systems and, more particularly, to a planting system with a container configured at least partially to simulate the appearance of an egg shell.

2. Description of the Related Art

Many different plant container configurations have been derived over the years to appeal to different tastes and for use in different environments. As one example, it is known to use egg shells as containers for planting medium, thereby creating an interesting visual effect.

While the use of egg shells in the above manner potentially creates an appealing visual effect, there are certain drawbacks associated with using egg shells in this manner.

First, preparation of the egg shell to function as a container is a difficult and delicate operation. The shell is, by its nature, very brittle. The user must initially fracture the shell and strategically remove portions thereof to achieve a desired end shape. During this process, cracks may develop that render the shell useless for its intended purpose.

Second, the user must dispose of the shell contents. Most commonly, the edible portion of the egg will be discarded, which represents both waste and an inconvenience.

Third, the user must introduce growing medium into the prepared shell. This, again, is a delicate operation in that even a minimal compaction pressure on the growing medium may cause unwanted cracking of the shell.

Fourth, a drainage hole is generally formed in the egg shell to allow drainage through the placed growing medium. This may be accomplished as through a drill or pick. During the process, the shell is again prone to cracking. Further, the drainage hole provides a stress concentration from which cracks may propagate.

Fifth, the composition of the shell is such that it is prone to absorbing moisture and chemicals, which may hasten its deterioration. In a relatively short period of time, the shell may discolor and decompose to the point that it is no longer functional as a container. Transplanting of the contents thereof to a newly prepared shall may be difficult or impossible to do.

Sixth, due to the fragile nature of the egg shell, particularly after a portion thereof has been removed, it is difficult to place any type of aesthetic enhancement thereon. This enhancement may be in the nature of coloring, designs, etc. The nature of the egg shell is such that the type of enhancement possible thereon is quite limited. Further, there may be a reluctance to invest too much time in enhancing the egg shell when it is anticipated that deterioration will occur in such a short time frame.

Seventh, while the configuration of the egg shell is aesthetically desirable, those that are more practically useable as containers for vegetation generally have a limited dimension, on the order of a couple of inches on the longer dimension of the oval. Consequently, the nature of what can be planted in the egg shell is inherently limited, as is its maintenance. The addition of any significant amount of soil and/or plant food may be difficult or impossible to effect without destroying the egg shell. Consequently, users are not likely to plant vegetation that has any significant anticipated life span.

Eighth, because of the fragile nature of the egg shells, it is generally impractical to package, display, and ship them commercially with or without growing medium therein. Consequently, the egg shells are generally used as planters at the same location at which they are prepared for planting. Thus, the egg shells have very little commercial value in terms of their being offered as a planting component. As a result, egg shells are generally prepared as planting containers only in school and craft class environments.

Ideally, egg shells would be useable as planting containers without contending with all of the above limitations and drawbacks.

SUMMARY OF THE INVENTION

In one form, the invention is directed to the combination of a container and a growing medium for a plant. The container is made to simulate the appearance of an egg shell bounding a receptacle. The growing medium is provided in the receptacle.

In one form, the container has at least first and second parts that are separable from each other.

The first part may have an associated base assembly for maintaining the first part in an operative orientation wherein the first part defines an upwardly opening cup shape bounding the receptacle.

The base assembly may have a flat surface to bear upon an upwardly facing, subjacent surface so as to maintain the first part in the operative orientation.

In one form, the first part of the container has a jagged edge that simulates the appearance of a broken egg shell.

The container receptacle may be covered by a separable barrier layer that confines the growing medium.

The barrier layer may be defined by a second container part that is selectively separable from the first part.

The first and second container parts may be releasably press fit together.

In an alternative form, the first and second container parts are joined through a frangible connection that can be fractured to allow separation of the first and second container parts.

The container may have an opening therein to communicate liquid from within the receptacle gravitationally to externally of the receptacle.

The first and second parts may cooperatively define a substantially closed, oval shape that simulates the appearance of an intact egg shell.

In one form, the growing medium consists of soil mixed with a plant growth stimulator.

The growing medium may further include plant seed mixed with the soil.

In one form, the container is made at least partially from at least one of a ceramic material and terra cotta.

In one form, the container has a wall that can be fractured by a user to produce a jagged edge to simulate a broken egg shell.

The frangible construction of the container wall may be such as to allow the container wall to be fractured in a predetermined manner.

Alternatively, the container wall may be fractured in different predetermined manners as selected by a user to produce a desired end appearance.

In one form, the opening in the container is blocked by a releasable closure element.

The container may be provided in combination with materials to facilitate adornment of exposed portions of the container.

In one form, the container has integrally formed adornment thereon.

BRIEF DESCRIPTION OF THE DRAWINGS

These and other advantages of the invention will become more apparent from an embodiment which is now described as an example by the aid of the drawings.

FIG. 1 shows a perspective view of a container, according to the present invention, with a growing medium in which plants are propagating in a receptacle defined by the container.

FIG. 2 shows a bottom view of the container in FIG. 1.

FIG. 3 shows an elevation view of the container in FIGS. 1 and 2 wherein a releasable barrier layer is provided over the receptacle.

FIG. 4 shows a view as in FIG. 3 of a modified form of container having parts that can be strategically separated to reconfigure the container.

DETAILED DESCRIPTION OF THE PREFERRED EMBODIMENTS

Figure 5:
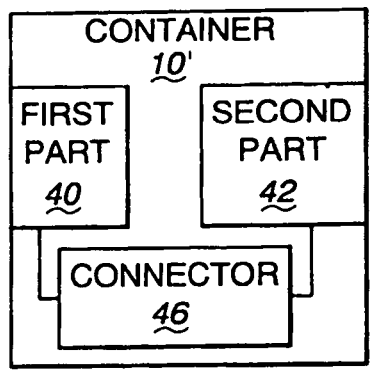
FIG. 5 shows a schematic representation of a connector between container parts as shown in FIG. 4.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In FIGS. 1 and 2, one form of container, according the present invention, is shown at 10. The container 10 has a wall 12 that is shaped to simulate the appearance of an egg shell that bounds as a receptacle 14. Within the receptacle 14, a growing medium 16 is placed. Seeds 18 are placed in the growing medium 16, which germinate to produce plants 20. For purposes of discussion herein, "plant" is intended to encompass any growing composition, be it technically plant, flower, etc. The growing medium 16 may be made up of soil and an additive that facilitates of stimulates the germination of the seed 18 and growth thereof.

The wall 12 has a generally upwardly opening, cup shape with an upper edge 22 that is jagged to simulated the appearance of a broken egg shell. The wall 12 can be made from virtually a limitless number of different materials, among which are preferred materials such as ceramic and terra cotta. However, the material could be plastic, composite, metal, etc. Alternatively, the wall 12 can be made from different materials that are used to exploit desired properties thereof. As just one example, an insert 24 is shown on the wall 12 to contrast with the remaining portion of the exposed surface 26 of the wall 12. The insert 24 might be clear as compared to the remainder of the exposed surface 26, or might be reflective, or otherwise eye catching, either by itself or in coordination with the remainder of the wall 12.

The bottom of the wall 12 has a base assembly 28 to facilitate support of the container 10 in an operative orientation relative to an upwardly facing surface on a subjacent support 30. In this embodiment, the base assembly 28 consists of a flat at the bottom of the wall 12.

To facilitate drainage, an opening 32 is provided through the base assembly 28. The opening 32 communicates liquid from within the receptacle 14 to externally thereof under gravitational force. In this embodiment, a releasable closure element 34 is applied over the opening 32 to effect blocking thereof. The closure element 34 may be made with a fixed or flexible shape and may be attached, for example, by an adhesive which allows it to be peeled away from the base assembly 28. A projecting tab 38 facilitates gripping of the closure element 34 and its peeling away from the base assembly 28.

The container 10 may be initially made in the shape shown in FIGS. 1 and 2. If configured in the "broken egg" shape in FIG. 1 with the jagged edge 22, the receptacle 14 may be covered with a separable barrier layer 39 that may be, for example, a conformable film that is frictionally gripped against part of the exposed surface 26 sufficiently to block the escape of the growing medium 16 from the receptacle 14. The film 39 may be clear to facilitate viewing of the contents of the receptacle 14, as at point of purchase. For convenience and integrity, the barrier layer 39 may be wrapped fully around the container 10. In FIG. 3, the barrier layer 39 is wrapped over the top of the container 10 and extends to slightly above the flat 28 at the bottom of the wall 12. The barrier layer 39 might have any appearance that makes it appealing, as to a prospective purchaser.

In a modified form of container, Shown at 10' in FIG. 4, the container 10' has a reconfigurable shape. In this embodiment, the container 10' has a wall 12' which defines a substantially fully enclosed shape that simulates the appearance of an intact egg shell. The wall 12' bounds a receptacle 14' within which the growing medium 16 is placed.

The container 12' is defined by a first part 40 and a second part 42 that cooperatively bound the receptacle 14'. The first and second parts 40, 42 meet at a separation line 44, that extends continuously around the periphery of the "egg" to produce an exposed, jagged, upper edge 22' on the first part 40, with the second part 42 separated from the first part 40.

As shown generically in FIG. 5, the first part 40 and the second part 42 on the container 10' are joined through a connector 46. The second part 42 functions as a barrier layer to confine the contents of the receptacle 14'. The connector 46 may be such that a connection therethrough is effected by snap connecting the first and second parts 40, 42. The connector 46 may include a separate element that maintains the first and second parts 40, 42, together. Alternatively, the connector may be maintained through frictional engagement between the first and second parts 40, 42. As a still further alternative, the connector 46 may be defined partially or fully by the barrier layer 39 which maintains the first and second parts 40, 42 together as a unit. As a still further alternative, the connector 46 may consist of a frangible portion 48 extending partially or fully along the extent of the separation line 44.

By fracturing the frangible portion 48, the second part 42 can be separated from the first part 40 so as to thereby expose the receptacle 14'. The frangible portion 48 may be constructed so that it can be fractured in a predetermined manner by a twisting force between the first and second parts 40, 42, or by applying an impact force to the second part 42. As a further alternative, the first and second parts 40, 42 may be separated by a tensile force applied in opposite directions on the first and second parts 40, 42.

The invention contemplates virtually any way to releasably join the first and second parts 40, 42. For example, a water soluble adhesive may be used to maintain the first and second parts 40, 42 together. By exposing the connection 46 to water, the frangible portion 48 will "fracture" by melting.

As shown in FIG. 4, the second part 42 may include a separable third part 50, that is releasably joined to the second part 42, through any type of connector 46', corresponding to the connector 46, as described above. By separating the third part 50, an exposed, jagged edge 22" is formed on the second part 42, thereby giving the resulting container 10' a still different overall appearance. By selectively removing the second or third parts 42, 50, a desired configuration for the resulting container 10' can be selected by the end user.

In the container 10', an optional fill opening 52 is provided to introduce the growing medium 16 to the receptacle 14'. This allows the container 10' to be formed into the FIG. 4 shape, after which the growing medium 16 can be introduced through the fill opening 52. The fill opening 52 may be left exposed or blocked by an appropriate cover 54. The cover 54 may be a discrete element. Alternatively, the aforementioned barrier layer 39 may be utilized to cover a substantial areal portion of the exposed surface of the container 10' or a smaller area over the fill opening 52 to confine the growing medium 16 in the receptacle 14'.

Figure 6:
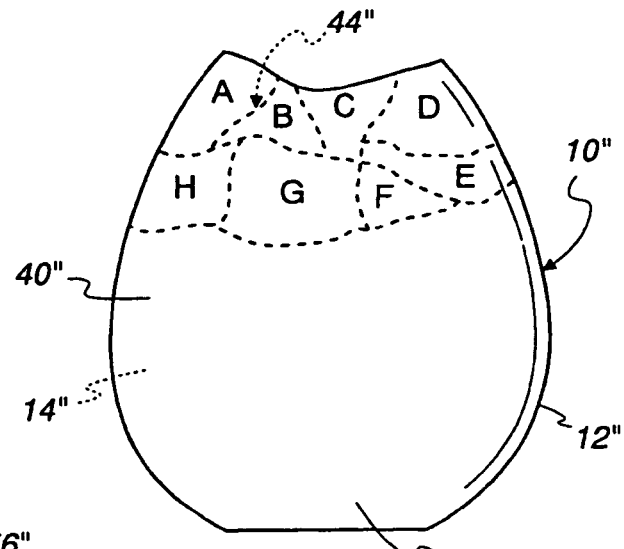
FIG. 6 shows a view as in FIGS. 3 and 4 of a further modified form of container, according to the present invention, and including separable parts to allow reconfiguration of, the container.

In FIG. 6, a further modified form of container is shown at 10". The container 10" consists of a wall 12" with a first part 40" defining an upwardly opening receptacle 14" and a bottom flat 28". In this embodiment, a network of separation lines 44" is provided to allow separation of a number of discrete parts, identified as A-H. The user can selectively separate the parts A-H in a predetermined manner along the separation lines 44". For example, the user can break off any one, or a number, of the parts A-H. One possibility is to one-by-one snap off the parts A-H to arrive at the desired depth of the receptacle 14" and overall desired appearance of the resulting container wall 12". In one form, the individual parts A-H can be grasped between the user's fingers and snapped off. Connectors of the type previously described are also contemplated at each separation line 44".

Figure 7:
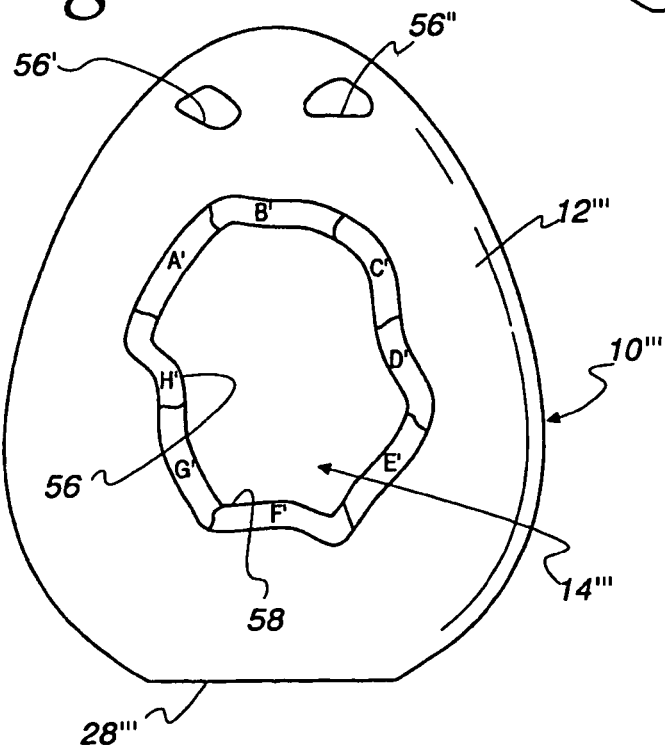
FIG. 7 shows a view as in FIGS. 3, 4 and 6 of a modified form of container, according to the present invention, wherein fully surrounded openings are provided between the top and bottom of the container.

The invention contemplates that the receptacles can be defined other than by removal of the top of the "egg". For example, a container 10''' is shown in FIG. 7 consisting of a wall 12''' in the form of an egg with a bottom flat 28''' and an opening 56 through which a receptacle 14''', defined by the wall 12''', is exposed. The opening 56 is fully bounded by a jagged edge 58 that can be reconfigured by separating wall parts A'-H', corresponding to the wall parts A-H shown in FIG. 6.

In this embodiment, additional, optional openings 56', 56" are also shown through the wall 12''' for purposes of aesthetics. The openings 56', 56" are fully surrounded by the container wall 12'''.

Figure 8:
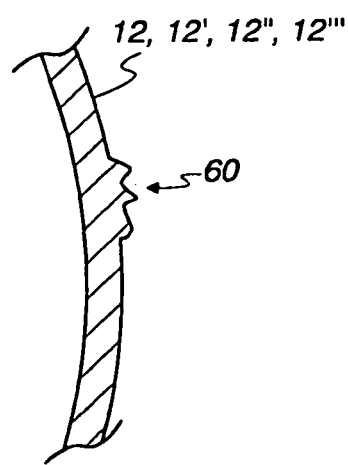
FIG. 8 shows an enlarged, fragmentary, cross-section view of a wall on the containers in FIGS. 1 through 7, with adornment integrally formed thereon.

As shown in FIG. 8, adornment 60 may be integrally formed on the walls 12, 12', 12", 12''', at selected locations, or over the entire exposed area of its container 10''' to produce a desired visual effect. In this embodiment, the adornment 60 is raised to add another dimension to the appearance of the container with which the wall 12, 12', 12", 12''' is associated.

Figure 9:
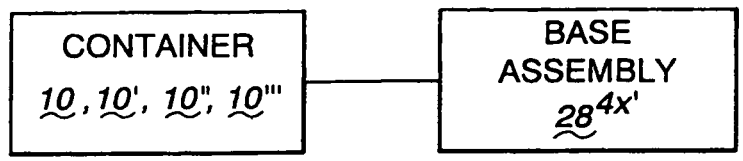
FIG. 9 shows a schematic representation of a base assembly on the container shown in FIGS. 1 through 8.

Whereas the base assembly 28, 28', 28", 28''' has been shown on the containers 10, 10', 10", 10''' as a flat surface, as shown in FIG. 9, the invention contemplates virtually any type of integral or separate base assembly, as shown generically at $28^{4x'}$ with respect to the container 10, 10', 10", 10'''.

Figure 10:
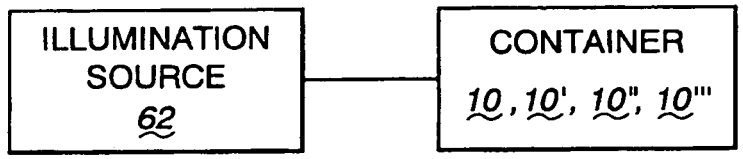
FIG. 10 shows a schematic representation of the containers in FIGS. 1 through 9 having an associated illumination source.

As shown in FIG. 10, the appearance of the containers 10, 10', 10", 10''' can be further enhanced by including an illumination source 62. The illumination source 62 may be incorporated in virtually a limitless number of different manners. For example, the illumination source 62 may project light from within the receptacles 14, 14', 14", 14''' or through openings in the walls 12, 12', 12", 12'''. Alternatively, the illumination source 62 may be designed to project light through the walls 12, 12', 12", 12''', as by making all or part of the walls 12, 12', 12", 12''' capable of transmitting light through the use of transparent/translucent materials. As a further alternative, fiber optics may be incorporated into the walls 12, 12', 12", 12''' to generate visible light in desired patterns.

Figure 11:
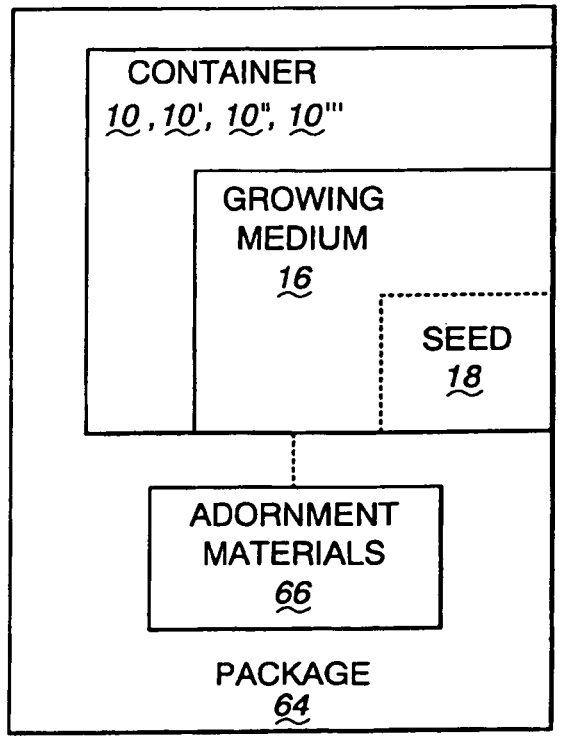
FIG. 11 shows a schematic representation of a kit including the inventive containers, and adornment materials for changing the appearance of the container, integrated through the use of a package.

As shown in FIG. 11, the invention contemplates sale of a series of components as a package 64, consisting of any of the containers 10, 10', 10", 10''' including the growing medium 16 and seed 18, with adornment materials 66 that allow the end user to alter in a desired manner the appearance of the containers 10, 10', 10", 10'''. Accordingly, the end user has the option of effecting a reconfiguration of the containers 10, 10', 10", 10''', as well as customizing adornment on exposed parts thereof. The package 64 integrates the components into a saleable, unitary kit.

The foregoing disclosure of specific embodiments is intended to be illustrative of the broad concepts comprehended by the invention.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. In combination:
  a container having a first part and a separate second part that, when joined together in an initial closed condition, stimulate the appearance of an egg shell bounding a receptacle, said first part and said second part being separable from one another and meeting at a separation line, said first part having a jagged edge that simulates the appearance of a broken egg shell when the first and second parts are separated from one another along said separation line to place said container in an open condition, said first and second parts being joined by a connector;
  said connector being water soluble and configured to fracture when exposed to water;
  a growing medium for a plant in the receptacle; and
  at least one plant seed mixed with the growing medium in both said closed and open conditions.

2. The combination according to claim 1 wherein the first part has an associated base assembly for maintaining the first part in an operative orientation, said first part defining an upwardly opening cup shape bounding the receptacle.

3. The combination according to claim 2 wherein the base assembly includes a flat surface to bear upon an upwardly facing surface so as to maintain the first part in the operative orientation.

4. The combination according to claim 1 wherein the container has an opening therein to communicate liquid from within the receptacle gravitationally to a location external to the receptacle.

5. The combination according to claim 1 wherein the growing medium includes soil mixed with a plant growth stimulator.

6. The combination according to claim 1 wherein the container is made at least partially from at least one of a ceramic material and terra cotta, and said connector extends partially or fully along said separation line between said first and second parts.

7. The combination according to claim 1 wherein the connector can be fractured by a user applying an impact force to said second part to expose the first part jagged edge that simulates a broken egg shell.

8. The combination as set forth in claim 1, wherein said separation line includes a network of separation lines configured to allow separation of a number of discrete parts of said container along said separation lines.

9. A planting system comprising a base and a top that, when joined together by a connector, form a closed receptacle having an ornamental shape, said receptacle containing at least one plant seed and a plant growing medium that includes soil, said plant seed being mixed with said soil in said closed receptacle prior to opening thereof, said top being configured to be removed in use by fracturing said connector, said connector being water soluble and configured to fracture when exposed to water to open an upper part of said base such that said base forms an open receptacle and allows said plant seed to germinate and produce a plant in said plant growing medium when water is added.

10. The planting system as set forth in claim 9, wherein said connector is formed of a frangible material that, when fractured, provides for removal of the top, said frangible material extending along a separation line between said base and said top.

11. The planting system as set forth in claim 10, wherein said base has a flat surface to bear upon a horizontal support surface so as to maintain said receptacle in an operative orientation for growth of the plant in said growing medium, an upper edge of said open receptacle defining an upwardly opening cup shape once the top has been removed.

12. The planting system as set forth in claim 11, wherein said base has an aperture to communicate liquid from within the receptacle gravitationally to a location external to the receptacle.

13. The planting system as set forth in claim 9, wherein said system further includes a plurality of plant seeds contained in and mixed with said growing medium within said closed receptacle.

14. A planting system comprising:
a closed receptacle having an upright operative position in which the receptacle is supported on a horizontal support surface, the receptacle including a base having a flat surface that rests on said support surface and an upper part sealed to said base along a separation line by a connector, said connector including a frangible material that extends partially or fully along said separation line and, when fractured, allows said upper part to be removed from said base such that said base forms an open receptacle;
said connector being water soluble and configured to fracture when exposed to water; and
at least one plant seed mixed with a growing medium being contained within said closed receptacle such that, when the upper part of the receptacle has been removed by fracturing the frangible material, the plant seed already mixed with the growing medium can germinate and grow in said open receptacle base.

15. The planting system as set forth in claim 14, wherein an upper edge of said base is lagged and defines an upwardly opening cup shape once the upper part has been removed.

16. The planting system as set forth in claim 14, wherein said frangible material is constructed to be fractured by a twisting force between the base and the upper part.

17. The planting system as set forth in claim 14, wherein said frangible material is constructed to be fractured by applying an impact force to the upper part.

18. The planting system as set forth in claim 14, further comprising a network of separation lines configured to allow separation of a number of discrete parts of said base along said separation lines.

* * * * *